United States Patent [19]

Lazzarotti et al.

[11] 4,150,743

[45] Apr. 24, 1979

[54] SINGULATION DEVICE FOR MAIL

[75] Inventors: Sebastian J. Lazzarotti; Robert S. Bradshaw, both of Broomall; James R. Hunter, Chadds Ford, all of Pa.

[73] Assignee: Burroughs Corporation, Detroit, Mich.

[21] Appl. No.: 864,384

[22] Filed: Dec. 27, 1977

[51] Int. Cl.[2] .............................................. B65G 47/30

[52] U.S. Cl. .................................... 198/460; 198/444; 198/466; 271/18; 271/110

[58] Field of Search ............... 198/443, 459, 460, 464, 198/465, 466, 467, 474, 444, 524, 469; 214/1 M; 271/8 R, 18, 109, 110, 111, 264, 265, 250

[56] References Cited

U.S. PATENT DOCUMENTS 2,847,110 8/1958 Rysti .................................... 198/444

3,927,876 12/1975 Wojtowicz et al. ............... 271/18 X

FOREIGN PATENT DOCUMENTS 662730 12/1951 United Kingdom ..................... 198/443

*Primary Examiner*—Robert B. Reeves

*Assistant Examiner*—James L. Rowland

*Attorney, Agent, or Firm*—Francis A. Varallo; Edmund M. Chung; Kevin R. Peterson

[57] ABSTRACT

A document singulator is described for use in separating into single items mail pieces derived from a source of collection mail. The device comprises a plurality of spaced-apart singulation stations each having a friction roller and adapted to be actuated in a predetermined manner to effect the separation of documents lying on top of one another. The rollers are mounted in an inclined slide which has a compound slope and a single registration wall, thereby assuring mail flow down the length of the slide as well as proper registration of the mail pieces at each station. The device is capable of processing a variety of mail pieces including flats such as magazines, folded newspapers, etc., and is virtually free from hard, mail-damaging jams.

10 Claims, 7 Drawing Figures

SINGULATION DEVICE FOR MAIL

CROSS-REFERENCE TO RELATED APPLICATION

In copending patent application Ser. No. 864,258 for "Mail Singulation and Culling System" by James R. Hunter et al., there is described a mail processing system in which the singulator of the present invention finds particular utility. Reference should also be made to U.S. Pat. No. 3,927,876 entitled "Device for Singulating Documents" by Edward A. Wojtowicz in which there is described and claimed a device for feeding documents one at a time from a stack thereof. Both the aforementioned application and patent are assigned to the same assignee as the present application.

BACKGROUND OF THE INVENTION

In mail processing, it is usually necessary at some point to separate or singulate the documents one from the other. Most present day devices are designed to singulate mail pieces which fall within a given size range, such as letter mail. As a result, these devices are not capable of handling mixed mail comprising, for example, (in addition to letters), flats, magazines, newspapers, etc.

The singulation device of the reference patent separates documents, including flat mail pieces, arranged and presented to it in stack form, by using multiple stages. The latter includes a drop ledge, a friction roller, and a vacuum roller. The stacks of mail are previously oriented and faced so that an operator can view them after singulation. The singulation stages are situated in a confined area and are necessarily limited in number.

It will be appreciated that the singulator of the reference patent may be used successfully in many applications. However, a need existed for a singulator capable of processing same time, it must be highly reliable with a negligible doubles rate and must be easy to maintain.

The singulator of the present invention described hereinafter fills these requirements.

SUMMARY OF THE INVENTION

In accordance with the present invention, the singulator incoporates a slide having a compound slope which enhances the gravitational forces acting upon the documents. The slide incorporates a single registration wall and the documents are guided down the incline in an orderly and uniform manner with one common side edge registration. Situated in spaced-apart relation along the slide are singulating stations, each including a friction roller and document sensing means on both sides thereof. Documents travelling down the slide are also leading edge registered as they impact and momentarily park at each singulating roller in preparation for further processing in equipment located beyond the singulator. The number of singulation stations is a function of the desired singulation reliability and is limited only by physical space constraints.

In a typical singulation operation, the rotation of a first friction roller associated with a first singulation station is controlled by a pair of photocell sensor assemblies and clock timing means. The first sensor assembly is located downstream adjacent the first roller and the second sensor assembly, upstream adjacent a second roller associated with the second singulation station.

Initially, it is assumed that one or more documents are in the first station and that both rollers are stationary. The sensing of the absence of a document at the second station by the second sensor assembly initiates the rotation of the first roller. This rotation is limited to a predetermined angle, for example 90 degrees, unless halted in response to the first sensor assembly's detection of a document moving toward the second station. If rotation has progressed through the predetermined angle and has stopped, a dwell period is initiated, during which detection of a document by the first assembly will temporarily halt the resumption of rotation of the first roller. On the other hand, if no document is detected, the second station remains unoccupied, and following the dwell period, rotation of the first roller will recommence until halted by the second sensor assembly's detection of a document at the second station.

It should be noted that should more than one document arrive at a singulation station, succeeding stations operated in the manner described hereinbefore will separate them and produce the desired singulation output. The number of stations employed are limited only by space constraints.

These and other features of the invention will become more fully apparent in the detailed description of the singulator and its mode of operation, which follows.

DESCRIPTION OF THE PREFERRED EMBODIMENT

Figure 1:
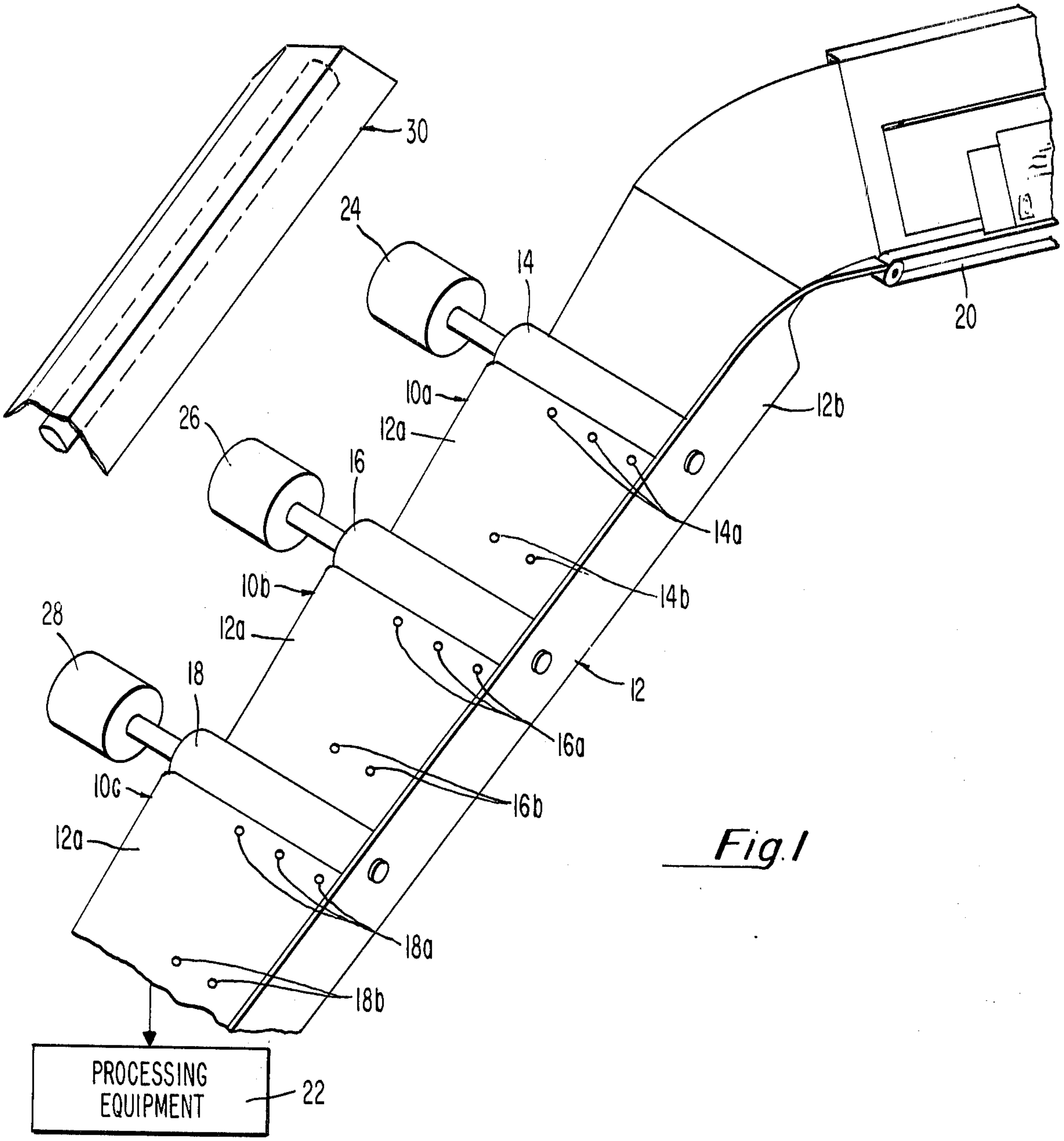
FIG. 1 is a pictorial view of a singulator slide having three singulation stations.

A singulator 10 having three singulation stations **10*a*, 10*b* and 10*c* positioned along a slide 12 is illustrated in FIG. 1. In an actual embodiment, the singulation stations include respective rollers 14, 16 and 18, each covered with a high coefficient of friction compound. Each roller is mounted on sheet metal guides. The back 12*a* and edge 12*b* guides of the slide 12 form a 90-degree "V" trough which is sloped downwards at approximately 45 degrees from the horizontal. Singulation photocell assemblies 14*a*, 14*b*; 16*a*, 16*b*; 18*a*, 18*b* are associated with the respective rollers 14, 16 and 18. The photocell assemblies are illuminated by a fluorescent lamp assembly 30. The rollers 14, 16 and 18 are independently driven by respective controller stepping motors 24, 26 and 28** in order that they can be rapidly started and stopped.

Figures 2A, 2B, 2C:
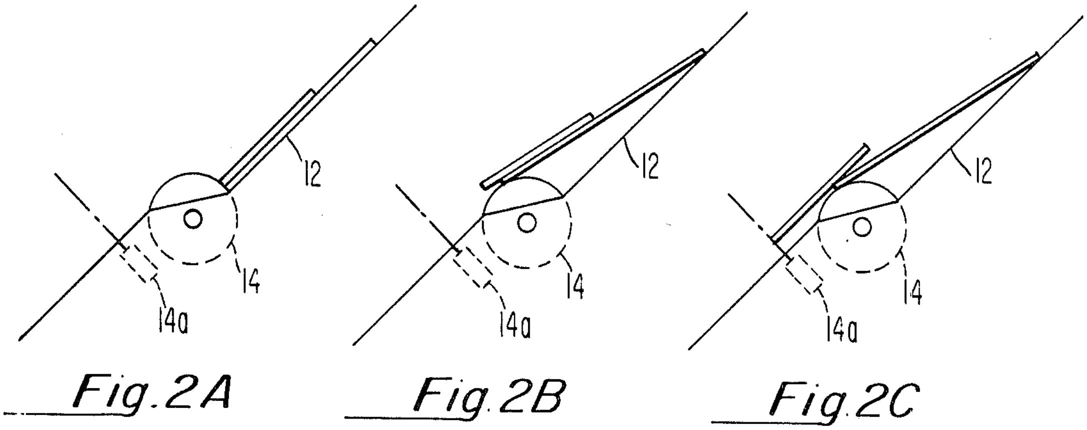
FIGS. 2A, 2B, and 2C indicate in schematic form the sequence of events involved in the separation of the mail pieces by the friction roller in one of the stations shown in FIG. 1.

Mail flow through the singulation stations beings with the advancement of mail to the upper singulation station **10*a*. As seen in FIG. 1, the mail carried on edge by a conveyor 20 may be caused to curve around the transition between the conveyor and singulator and to slide down to the first roller 14. The sequence of singulation by a roller is illustrated in FIGS. 2A, 2B and 2C. In FIG. 2A two pieces of mail are shown resting on the roller 14. A signal calling for mail derived from photocells 14***b* upstream of roller 16 (FIG. 1) causes the roller 14 to rotate approximately 90 degrees and then stop. The two mail pieces advance to the position illustrated in FIG. 2B. During the roller dwell period the top mail piece continues to slide while the bottom piece is restrained by the roller 14. As seen in FIG. 2C, the top mail piece continues to slide down to the next singulation stage 10*b*, the leading edge of the document interrupts the photocell assembly 14*a* which generates a signal to prevent the roller 14 from restarting its rotation. The bottom mail piece remains in this position until the next feed signal from photocells 14*b* is received. If the photocells 14*a* are interrupted before the roller has moved 90 degrees, the rotation of roller 14 will be stopped at that time.

If there had been only a single mail piece on the roller in the previous example, then at the end of the roller dwell period the photocells 14*a* would not have been interrupted and the roller 14 would have been restarted and rotated until the single mail piece had been advanced to roller 16 of the next singulation station 10*b*.

If there had been three mail pieces on the roller, the top two mail pieces might have advanced to the second singulation station 10*b* and would be singulated there. The third singulation station 10*c* is an additional stage to reduce to a minimum the number of double documents which might enter the succeeding processing equipment 22.

Figure 3:
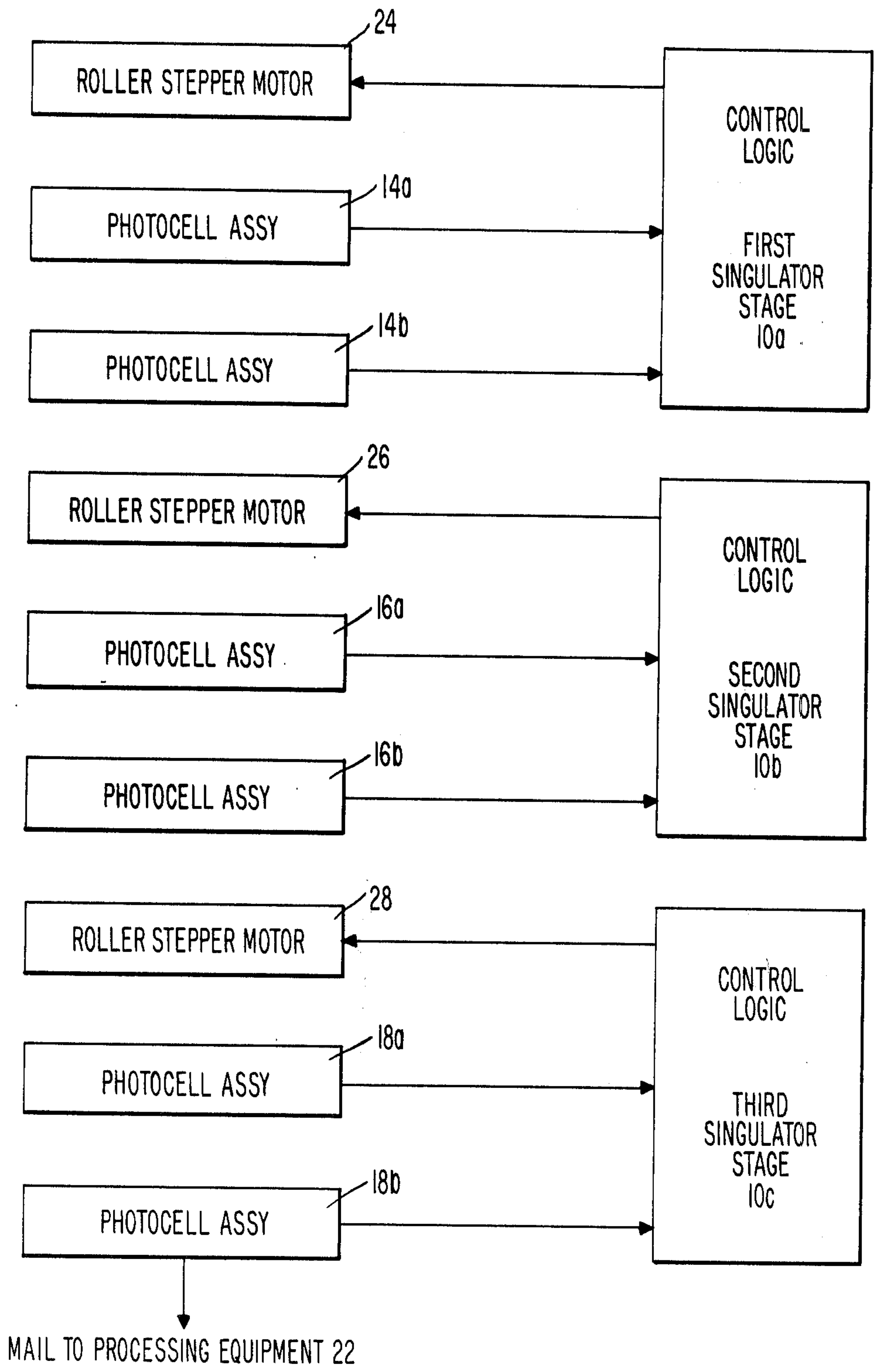
FIG. 3 is a block diagram indicating the electronic subassemblies and mail flow associated with complete singulation.

FIG. 3 is a block diagram indicating the electronic subassemblies and mail-flow associated with complete singulation. Three singulation stages, or stations 10*a*, 10*b* and 10*c*, are indicated. The singulation performed in each station is under the control of a pair of photocell assemblies, for example, photocell assemblies 16*a* and 16*b* provide input signals to the control logic circuit of stage 10*b*. The logic on the other hand applies a signal to the roller stepper motor (26 in this case) to control its operation. The output mail stream from the third and last singulation stage is delivered to the succeeding processing equipment 22.

Figure 4:
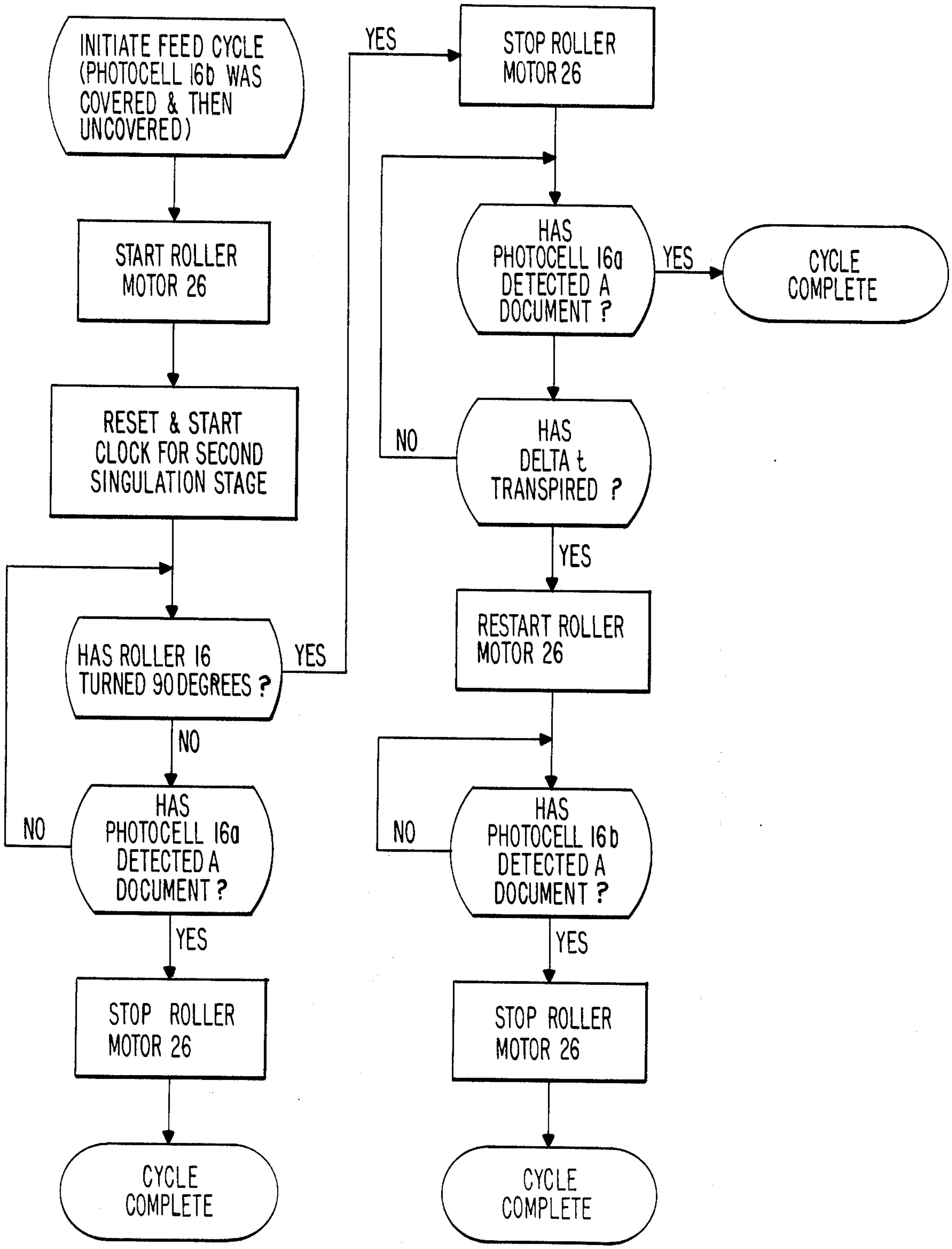
FIG. 4 is a flow diagram indicating the control sequence associated with one of the singulation stations and representative of all of the stations along the slide.
Figure 5:
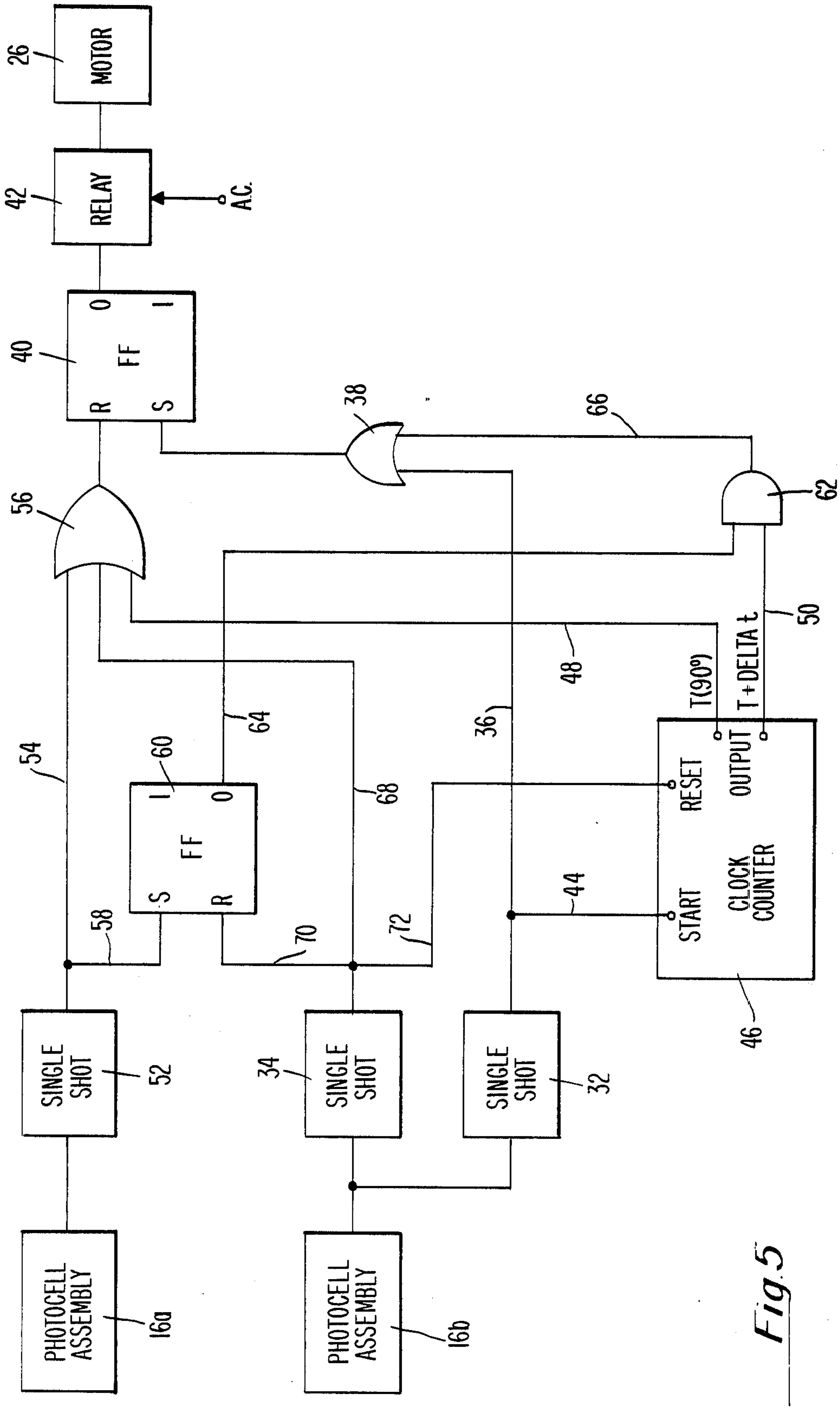
FIG. 5 is a logic circuit diagram applicable to each of the singulation stages for implementing the flow diagram of FIG. 4.

FIG. 4 is a flow diagram illustrating the control sequences associated with the second singulation stage 10*b* which is typical of all three stages. FIG. 5 is a logic circuit diagram applicable to each of the singulation stages, representing the "control logic" of FIG. 3 and implementing the flow diagram of FIG. 4.

In the description which follows, reference may be made to both FIGS. 4 and 5, the former for general operation, the latter for specific details.

Considering the operation of the second singulation stage 10*b*, it has been observed hereinbefore that photocell assembly 16*b* is used to detect the need for mail from roller 16. Photocell assembly 16*a*, on the other hand, is used in discriminating between single and multiple pieces of mail above roller 16.

In order to initiate a feed cycle from roller 16, it is assumed that photocell 16*b* which was formerly dark, that is, covered by a document parked at roller 18 of the third singulation stage 10*c*, has gone light as the last mentioned document is removed by roller 18. A signal corresponding to the dark-to-light transition of photocell assembly 16*b* is applied to and triggers single-shot 32. Another single-shot 34 is unaffected since it triggers only on signals derived from light-to-dark transitions in photocell assembly 16*b*. The output pulse of single-shot 32 is applied via line 36 to OR gate 38, the output of which appears on the SET terminal of motor control flip-flop 40. This action energizes solid-state relay 42 to apply AC line voltage to roller motor 26, thereby turning it on. Concurrently, the output pulse from single-shot 32 is applied via line 44 to the START terminal of clock counter 46. As will be noted hereinafter, the clock counter had been previously RESET by the action of photocell assembly 16*b* in the last singulation cycle. Thus, the clock counter 46 starts to run when photocell assembly 16*b* indicates that the trailing edge of a mail piece leaving station 10*b* has been detected. The clock counter provides distinct output pulses on lines 48 and 50 indicative of two time periods, "T" and "T plus delta t". The first of these represents the time elapsed for the stepper motor 26 to turn roller 16 through 90 degrees. The other output pulse occurs at the end of "T" plus a dwell period, "delta t".

It will first be assumed that while motor 26 is turning through 90 degrees, a document moves off roller 16 and momentarily causes photocell assembly 16*a* to go from light to dark, as it falls down the slide toward roller 18. The light-to-dark transition signal from photocell assembly 16*a* triggers single-shot 52 which in turn is applied on line 54 and via OR gate 56 to the RESET terminal of flip-flop 40. This action de-energizes relay 42, stopping motor 26. The output pulse from single-shot 52 also sets via line 58 a second flip-flop 60, which had been placed in the RESET state during the last singulation cycle. The operation of flip-flop 60 will become apparent hereinafter. At this time, the detection of a document by photocell assembly 16*a* has resulted in a complete cycle, since it is assumed that the document has been delivered to roller 18.

If during the 90 degree rotation of roller 16, photocell assembly 16*a* had not detected a document, the operation would have been as follows.

At the end of time "T" (90 degrees rotation), a pulse from clock counter 46 on line 48 is applied via OR gate 56 to the RESET terminal of flip-flop 40, de-energizing relay 42 and stopping motor 26. The cycle of operation is now within the "delta t" period. This period allows for the time it takes the top piece of mail, that is, a double on roller 16 to slip by the bottom piece which remains in contact with the roller, and fall the distance from the roller to photocell assembly 16*a*. If it is assumed that a double is present on roller 16, the detection of a document by photocell assembly 16*a* during the "delta t" period, generates a light-to-dark transition signal which triggers single-shot 52. The output of single-shot 52 is applied to OR gate 56 which tends to RESET flip-flop 40 and stop motor 26, had these conditions not already occurred at the end of the "T" time period as discussed hereinbefore. Flip-flop 60 is placed in the SET state. The singulation cycle for stage 10*b* is complete.

On the other hand, it will now be assumed that during the "delta t" period, no document was detected by photocell assembly 16*a*. It is therefore desirable to restart motor 26. This is accomplished by the pulse on the "T plus delta t" output line 50 of the clock counter 46. This pulse is applied to one input of AND gate 62. As mentioned previously, flip-flop 60 is normally in a RESET state and its output on line 64 is enabling for AND gate 62. The output of this last gate is applied on line 66 via OR gate 38 to set flip-flop 40 and to start motor 26.

It will be recalled that if during "delta t", photocell assembly 16*a* detects a document, flip-flop 60 is placed in the SET state. Under this condition, AND gate 62 is disabled and will remain so at the end of the "delta t" period, precluding the restarting of motor 26.

Continuing from the restarting of motor 26 after the elapse of time "T plus delta t", roller 16 will continue to turn until photocell assembly 16*b* detects the arrival of a document at roller 18. When this occurs, the signal from photocell assembly 16*b* during the light-to-dark transition triggers single-shot 34. The latter applies a pulse to three areas: to a first, on line 68 via OR gate 56 to RESET flip-flop 40 and stop motor 26; to a second, on line 70 to reset flip-flop 60; and to a third, on line 72 to reset clock counter 46. The present singulation cycle is complete. Thereafter, the trailing edge of a document passing photocell assembly 16*b* (mail leaving roller 18) will again initiate logical activity for a new cycle of operation.

In conclusion, a singulator has been described for separating into single items a variety of mail pieces including letters, flats, magazines and newspapers for further processing. It should be understood that changes and modifications of the device may be needed to suit particular requirements. Such changes and modifications insofar as they are not departures from the true scope of the invention, are intended to be covered by the following claims.

What is claimed is:

1. A singulation device for mixed mail pieces comprising in combination:

a singulator slide for receiving said mail pieces, said slide having a backplate and a single registration wall along a side thereof, a plurality of spaced-apart singulating stations disposed along said slide, each of said stations including a friction roller and a pair of document sensing means associated therewith, said sensing means being positioned at a pair of respective locations displaced from each other along the length of said slide downstream from said roller, said singulator slide having a compound slope wherein its longitudinal axis is inclined with respect to the horizontal and its transverse axis is further inclined from the horizontal in the direction of said registration wall, said compound slope enhancing the gravitational forces acting upon said mail pieces to guide them down the slide with one common side edge registration, logic control means responsive to each pair of document sensing means of the respective singulation stations for independently controlling the rotation of the roller associated therewith, thereby achieving progressive separation of said mail pieces.

2. A singulation device as defined in claim 1 wherein said pair of document sensing means are first and second photocell assemblies, each providing respective electrical signals for a light-to-dark transition upon detection of a mail piece entering its vicinity and a dark-to-light transition upon the detection of a mail piece leaving its vicinity.

3. A singulation device as defined in claim 2 wherein said first photocell assembly is located downstream from and in proximity to the roller of a given singulating station and said second photocell assembly is located upstream from and in proximity to the roller of the succeeding singulating station.

4. A singulation device as defined in claim 3 further including a motor control circuit which includes a motor coupled to each of said rollers for providing the independent rotation thereof.

5. A singulation device as defined in claim 4 wherein said logic control means includes means for coupling a dark-to-light transition signal from said second photocell assembly to said motor control circuit for starting said motor, a clock counter having a START and a RESET terminal, means coupling said last mentioned signal to said counter START terminal to initiate counts therein which are related to first and second time periods, said counter having first and second output terminals and providing thereon electrical signals indicative of the respective attainment of said first and second time periods, means coupling a signal from said first counter output terminal to said motor control circuit for stopping said motor, the angular rotation attained by said motor being a function of the duration of said first time period.

6. A singulation device as defined in claim 5 wherein said logic control means further includes means for coupling a light-to-dark transition signal from said first photocell assembly to said motor control circuit for stopping said motor.

7. A singulation device as defined in claim 6 wherein said logic control means further includes means for coupling a light-to-dark transition signal from said second photocell assembly to said motor control circuit for stopping said motor, a bistable device having SET and RESET input terminals, means coupling said last mentioned signal in common to the RESET terminal of said bistable device and to said RESET input terminal of said clock counter.

8. A singulation device as defined in claim 7 wherein said logic control means further includes means for coupling a light-to-dark transition signal from said first photocell assembly to the SET terminal of said bistable device, an AND gate having a pair of input terminals and an output terminal, means coupling said output terminal to said motor control circuit, said bistable device having an output terminal coupled to one of a pair of input terminals of said AND gate, the other input terminal of said last mentioned gate being coupled to said second counter output terminal for receiving a signal therefrom indicative of the attainment of said second time period, the latter period comprising said first time period for motor actuation plus a dwell period during which said motor is inactive, said AND gate being enabled only when said bistable device is in a reset state, the output signal from said AND gate being applied to said motor control circuit for starting said motor.

9. A singulation device as defined in claim 8 wherein said motor control circuit includes in series-connected relationship a control flip-flop and a relay, the latter being connected to said motor, the state of energization of said relay and the resultant starting and stopping of said motor being a function of the state of said control flip-flop.

10. A singulation device as defined in claim 9 further including a first single-shot circuit connected to the output of said first photocell assembly and adapted to be triggered by a light-to-dark transition signal, and a pair of single-shot circuits connected in common to the output of said second photocell assembly and adapted respectively to be triggered by light-to-dark and dark-to-light transition signals.

* * * * *

UNITED STATES PATENT AND TRADEMARK OFFICE

CERTIFICATE OF CORRECTION

PATENT NO. : 4,150,743

DATED : April 24, 1979

INVENTOR(S) : Sebastian J. Lazzarotti et al.

It is certified that error appears in the above-identified patent and that said Letters Patent are hereby corrected as shown below:

Column 1, line 38, after "processing" insert -- loosely collected mail, as distinguished from mail arranged in stacks. Moreover, the singulator should be relatively simple in construction and low in production cost. At the --.

Signed and Sealed this

*Thirty-first* Day of *July 1979*

[SEAL]

*Attest:*

*Attesting Officer*

LUTRELLE F. PARKER

*Acting Commissioner of Patents and Trademarks*